(12) United States Patent
Kneeburg et al.

(10) Patent No.: US 7,429,732 B2
(45) Date of Patent: Sep. 30, 2008

(54) SCANNING PROBE MICROSCOPY METHOD AND APPARATUS UTILIZING SAMPLE PITCH

(75) Inventors: David A. Kneeburg, Santa Barbara, CA (US); Rohit Jain, Ventura, CA (US); Jason R. Osborne, Lompoc, CA (US); Wei Yao, Ventura, CA (US); Matthew T. Klonowski, Santa Barbara, CA (US); Ingo Schmitz, Santa Barbara, CA (US)

(73) Assignee: Veeco Instruments Inc., Plainview, NY (US)

( * ) Notice: Subject to any disclaimer, the term of this patent is extended or adjusted under 35 U.S.C. 154(b) by 158 days.

(21) Appl. No.: 11/241,093

(22) Filed: Sep. 30, 2005

(65) Prior Publication Data

US 2007/0075243 A1    Apr. 5, 2007

(51) Int. Cl.
    *G01N 23/00* (2006.01)
(52) U.S. Cl. .......................... 250/306; 73/105; 977/849; 977/850; 977/851; 977/854
(58) Field of Classification Search ................. 250/306, 250/307; 73/105; 318/592, 685; 977/849, 977/850, 851, 854
    See application file for complete search history.

(56) References Cited

U.S. PATENT DOCUMENTS

| | | | | |
|---|---|---|---|---|
| 4,954,704 A | * | 9/1990 | Elings et al. | ................. 250/307 |
| 5,204,531 A | * | 4/1993 | Elings et al. | ................. 250/306 |
| 5,266,801 A | * | 11/1993 | Elings et al. | ................. 250/306 |
| RE34,489 E | | 12/1993 | Hansma et al. | |
| 5,283,442 A | | 2/1994 | Martin et al. | |
| 5,298,975 A | | 3/1994 | Khoury et al. | |
| 5,412,980 A | | 5/1995 | Elings et al. | |
| 5,825,670 A | * | 10/1998 | Chernoff et al. | ............... 702/85 |
| 6,267,005 B1 | * | 7/2001 | Samsavar et al. | ............. 73/105 |
| 6,714,892 B2 | | 3/2004 | Houge et al. | |
| 6,715,346 B2 | * | 4/2004 | Shuman | ........................ 73/105 |
| 6,986,280 B2 | * | 1/2006 | Muckenhirm | ................. 73/104 |
| 7,053,369 B1 | * | 5/2006 | Roessler et al. | ............. 250/306 |
| 7,323,657 B2 | * | 1/2008 | Cheng | .................... 219/121.69 |
| 2004/0031315 A1 | * | 2/2004 | Shuman | ........................ 73/105 |

OTHER PUBLICATIONS

Moloni, et al. "Stylus nanoprofilometry for mask metrology" in Microlithography World, Aug. 2004.*

* cited by examiner

*Primary Examiner*—Jack I. Berman
*Assistant Examiner*—Michael Maskell
(74) *Attorney, Agent, or Firm*—Boyle Fredrickson S.C.

(57) ABSTRACT

The preferred embodiments are directed to a method and apparatus of operating a scanning probe microscope (SPM) to perform sample measurements using a survey scan that is less than five lines, and more preferably two lines, to accurately locate a field of features of a sample. This is accomplished by selecting a step distance between adjacent lines of the survey scan that does not equal the pitch of the features in a direction orthogonal to the direction the survey scan traverses, i.e., does not equal the pitch of the features in the scan direction, $X_{PO}$. The aspect ratio of the scans can also be modified to further improve sample throughput.

32 Claims, 7 Drawing Sheets

SCANNING PROBE MICROSCOPY METHOD AND APPARATUS UTILIZING SAMPLE PITCH

BACKGROUND OF THE INVENTION

1. Field of the Invention

The present invention is directed to a method and apparatus for measuring surface features of a sample with a scanning probe microscope, and more particularly, to a method and apparatus that utilize information regarding the pitch of a field of devices/features of a sample to optimize measurement performance.

2. Description of Related Art

Several probe-based instruments monitor the interaction between a cantilever-based probe and a sample to obtain information concerning one or more characteristics of the sample. Scanning probe microscopes (SPMs), such as the atomic force microscope (AFM), are devices which typically use a sharp tip to make a local measurement of one or more properties of a sample. More particularly, SPMs typically characterize the surfaces of such small-scale sample features by monitoring the interaction between the sample and the tip of the associated probe assembly. By providing relative scanning movement between the tip and the sample, surface characteristic data and other sample-dependent data can be acquired over a particular region of the sample, and a corresponding map of the sample can be generated.

The atomic force microscope is a very popular type of SPM. The probe of the typical AFM includes a very small cantilever which is fixed to a support at its base and has a sharp probe tip attached to the opposite, free end. The probe tip is brought very near to or into direct or intermittent contact with a surface of the sample to be examined, and the deflection of the cantilever in response to the probe tip's interaction with the sample is measured with an extremely sensitive deflection detector, often an optical lever system such as described in Hansma et al. U.S. Pat. No. RE 34,489, or some other deflection detector such as an arrangement of strain gauges, capacitance sensors, etc. AFMs can obtain resolution down to the atomic level on a wide variety of insulating or conductive surfaces in air, liquid or vacuum by using piezoelectric scanners, optical lever deflection detectors, and very small cantilevers. Because of their resolution and versatility, AFMs are important measurement devices in many diverse fields ranging from semiconductor manufacturing to biological research.

Preferably, the probe is scanned over a surface using a high-resolution three axis scanner acting on the sample support and/or the probe. The instrument is thus capable of creating relative motion between the probe and the sample while measuring the topography or some other property of the sample as described, for example, in Hansma et al. supra; Elings et al. U.S. Pat. No. 5,226,801; and Elings et al. U.S. Pat. No. 5,412,980.

AFMs can be designed to operate in a variety of modes, including contact mode and oscillating flexural mode. In an oscillation "flexural mode" of operation the cantilever oscillates generally about a fixed end. One popular flexure mode of operation is the so-called TappingMode™ AFM operation (TappingMode™ is a trademark of the present assignee). In a TappingMode™ AFM, the tip is oscillated flexurally at or near a resonant frequency of the cantilever of the probe. When the tip is in intermittent or proximate contact with the sample surface, the oscillation amplitude is determined by tip/surface interactions. Typically, amplitude, phase or frequency of this oscillation is kept constant during scanning using feedback signals, which are generated in response to tip-sample interaction. These feedback signals are then collected, stored, and used as data to characterize the sample. When measuring semiconductor samples, such as the trench capacitors discussed herein, a particular version of this oscillating mode known as deep trench (DT) mode, which employs a unique and costly tip, is used.

Figure 1:
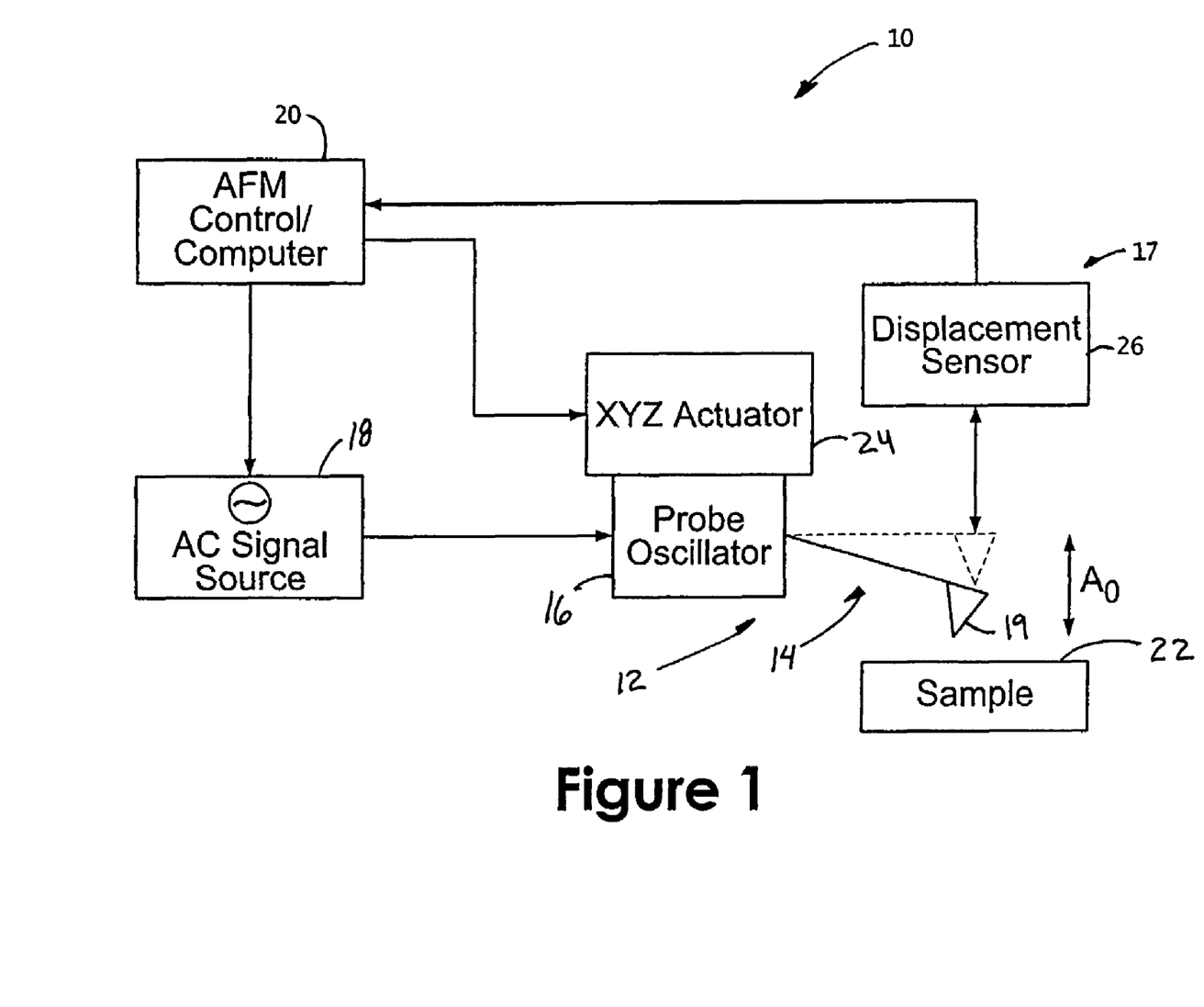
FIG. 1 is a schematic block diagram of an atomic force microscope labeled "Prior Art"

A typical AFM system is shown in FIG. 1. An AFM 10 employing a probe device 12 including a probe 14 having a cantilever 15 is coupled to an oscillating actuator or drive 16 that is used to drive probe 14, in this case, at or near the probe's resonant frequency. Commonly, an electronic signal is applied from an AC signal source 18 under control of an AFM controller 20 to drive 16 to oscillate probe 14, preferably at a free oscillation amplitude $A_o$. Notably, $A_o$ can be varied over a broad range, e.g., from microns to the nanometer scale, the latter being typically used for non-contact force measurements. As a practical matter, for low force interaction with the sample surface during imaging, $A_o$ should be as small as possible, but large enough to prevent the tip from sticking to the sample surface 22 due to van der Waals and/or adhesive forces, for example. Probe 14 can also be actuated toward and away from sample 22 using a suitable actuator or scanner 24 controlled via feedback by computer/controller 20. Notably, the oscillating drive 16 may be coupled to the scanner 24 and probe 14 but may be formed integrally with the cantilever 15 of probe 14 as part of a self-actuated cantilever/probe. Moreover, though the actuator 24 is shown coupled to the probe, the actuator 24 may be employed to move sample 22 in three orthogonal directions as an X Y Z actuator.

In operation, as the probe 14 is oscillated and brought into contact with sample 22, sample characteristics can be monitored by detecting changes in the oscillation of probe 14. In particular, a deflection detection apparatus 17 a beam is directed towards the backside of probe 14 which is then reflected towards a detector 26, such as a four quadrant photodetector. As the beam translates across detector, appropriate signals are transmitted to controller 20 which processes the signals to determine changes in the oscillation of probe 14. Commonly, controller 20 generates control signals to maintain a constant force between the tip and sample, typically to maintain a setpoint characteristic of the oscillation of probe 14. For example, controller 20 is often used to maintain the oscillation amplitude at a setpoint value, $A_s$, to insure a generally constant force between the tip and sample. Alternatively, a setpoint phase or frequency may be used.

As metrology applications demand greater and greater throughput, improvements when performing conventional AFM measurements have become necessary. Wafer analysis in the semiconductor industry is one key application. In general, chip makers need to measure structures having critical dimensions (CDs) that are 90 nm and below. When analyzing structures at such small scale, the corresponding measurements require uniformity control and must be able to accommodate high volume production environments. In this regard, one advancement has been in the area of automated AFMs, which greatly improve the number of samples that may be imaged in a certain time frame by minimizing expert user tasks during operation. Instruments for performing automated wafer measurements are varied but AFM offers a unique solution by providing, for example, the ability to perform high-resolution multi-dimension (e.g., 3-D) imaging. Some instruments, like the Dimension X automated AFM offered by Veeco Instruments, have proven 200 mm and 300 mm automation platforms.

Two key issues to be considered when evaluating the performance of instruments used to make such measurements include throughput and repeatability. Throughput, in this case, is the number of wafers that may be imaged per hour, and repeatability is the variation of repeated measurements made on the same object under identical conditions. A third issue concerns reproducibility, which is the variation that results when making the same measurement under different conditions. Reproducibility is important in that it determines whether the technique can accommodate condition variations when both positioning the wafer and focusing the optics. When considering these metrics, known systems have significant limitations.

To perform a semiconductor metrology experiment such as trench depth measurement of a semiconductor wafer, AFMs typically initially perform a survey scan and then perform a data scan. The survey scan acts as an aerial view of the wafer to establish a position at which the data scan may be taken. The data scan ultimately provides the information of interest (e.g., a characteristic dimension). More particularly, and as discussed in further detail below, the semiconductor wafer typically has a field of devices/features such as trenches having a location that typically is not known by the tool used for measuring the wafer. As a result, the tool must be aligned to the field to obtain quality data, and this is often accomplished with a survey scan.

In previous systems for measuring depths of semiconductor trench capacitors, the length of each scan line, spacing between adjacent scan lines (i.e., resolution or density), and number of scan lines is user-defined. For example, automated AFMs typically take a large number of lines of data (i.e., high density), for example, 32 or 48 lines each having a length of typically at least two times the pitch of the features over a set region to obtain a high resolution survey image. Typically, the pitch of a field of features has at least two components, one in "X" and one in "Y", for the 2-D array. The pitch is the distance in each direction in which the pattern of features repeats itself. The length and height of the scan may range from about 1 micron to 50 microns or more.

Thereafter, a pattern recognition operation is conducted to identify a pair of the features and thereby establish a center for the data scan. Then, a data scan at high resolution is performed using a zig-zag (i.e., raster) scan, typically around the midpoint of the identified trenches. Moreover, according to some techniques, multiple survey scans may be conducted; for example, one technique uses a first survey scan in "X" (typically part of a "searching" routine) and then performs a second survey scan in "Y" to establish the center. Overall, these known processes require a significant amount of time to complete, given the multitude of scans (both survey and data), and thus severely compromise throughput. When considering that the scans are conducted at high resolution, the limitation concerning poor throughput is only exacerbated.

Notably, other drawbacks also concern the high resolution of the scans. For instance, because the survey scan of these known techniques is a high density scan, the scan is often directed to a small feature set, e.g., one, or a pair, of surface feature(s). This small population yields conclusions that are less than ideal. For instance, as understood, pattern recognition programs provide superior output the larger the population of data. As a result, relatively small feature sets used in the prior art can severely adversely impact the quality of the measurement. Another drawback associated with high density scans is that the probes and corresponding tips are highly precise and costly components which need to be replaced after significant wear. By conducting such high resolution scans, tip life can be drastically reduced, a significant drawback considering that the tips may cost $1000 or more. A still further drawback is that high resolution scans take a long time to complete, as one would expect. Not only is this a limitation in and of itself, it leads to other problems, including making environmental factors more problematic. For example, measurement repeatability can be significantly reduced given that thermal drift is greater the more time it takes to perform a measurement.

Moreover, a further problem with known techniques is that when, for example, measuring the depth of the features, the data acquired over the series of scans is averaged. Noting that the maximum depth is often a key metric to be determined, this averaging of the data hinders the systems ability to identify maximum depth given that depth measurements less than the maximum are "averaged" along with, typically, the maximum of the series of scans. As a result, such methods typically undesirably underestimate trench depth.

As a result, what was desired in the field of automated AFM measurements, particularly in the semiconductor industry, was a method and system able to perform both survey and data scans with a minimum amount of lines over a broad range of user-selected scan lengths (e.g., to analyze a larger number of features/devices) without compromising measurement performance. Improved throughput and repeatability, as well as improved tip wear performance was ultimately needed.

SUMMARY OF THE INVENTION

The preferred embodiments overcome the above-noted drawbacks of known systems by providing a scanning probe microscopy apparatus and method that performs a survey scan in less than five (5) lines, and more preferably two (2) lines, to accurately locate a field of features of a sample. This is accomplished by selecting a step distance between adjacent lines of the survey scan that does not equal the pitch of the features in a direction orthogonal to the direction the survey scan traverses, i.e., does not equal the pitch of the features in the scan direction, $X_{po}$. As a result, data concerning a sample can be acquired in less than one (1) minute, and often less than five seconds, dramatically improving sample throughput. Moreover, using the present method and system, the characteristic dimension of the sample being measured can have a three-sigma dynamic repeatability that is less than the greater of 1.0% of the characteristic dimension and 1.0 nm.

According to a first aspect of the preferred embodiment, a method of acquiring data from a field of features of a sample includes performing a survey scan to locate a field using no more than five survey scan lines. Thereafter, a data scan may be performed, based on the survey scan, to acquire data indicative of at least one of the features.

In another aspect of this embodiment, the survey scan locates the field of features using no more than two survey scan lines. In this case, the distance between adjacent scan lines is substantially unequal to the pitch of the feature field in a direction orthogonal to the survey scan lines.

In a further aspect of this embodiment, the aspect ratio of an image from the data scan is such that the dimension of the ratio in a direction of the scan lines is larger than the dimension of the ratio in a direction orthogonal to the scan lines.

According to another aspect of this embodiment, the distance between the data acquisition lines is at least approximately equal to twice the pitch of the feature field along the first axis and the center of the scan area of the data scan is determined from the survey scan.

In a still further aspect of this embodiment, the determining step uses pattern recognition on the data acquired from the survey scan. Preferably, the pattern recognition algorithm used is XCALIPER®.

According to another preferred embodiment, a method of acquiring data from each of at least three trench capacitors of a trench capacitor field using a scanning probe microscope takes less than 1.0 minute from probe engagement. The acquired data is analyzed to determine a characteristic dimension of the trench capacitors, whereby the characteristic dimension has a three sigma dynamic repeatability of less than the greater of about 2.0% of the characteristic dimension and 2.0 nm.

According to a further aspect of this embodiment, the data is acquired in less than 30 seconds, but more preferably less than 5 seconds.

In another aspect of this embodiment, the characteristic dimension has a three sigma dynamic repeatability of less than the greater of 1.0% of the characteristic dimension and 1.5 nm. The method is particularly useful for analyzing trench capacitors that are sub-110 nm node trench capacitors.

According to a still further aspect of this embodiment, the acquiring step includes performing a survey scan along a first axis to locate the field on the sample surface and performing a data scan along a second axis to measure the dimension. Notably, the second axis is at least substantially orthogonal to the first axis.

In another embodiment of the present invention, a method of operating a scanning probe microscope (SPM) includes a providing a probe having a cantilever and comprises the steps of engaging the probe and a sample, where the sample includes a field of features having a first pitch in a direction of scanning and a second pitch in a direction ninety degrees to the scanning direction. Preferably, the method performs a scan of the sample along less than five lines of the sample, including moving substantially orthogonally to the scanning direction between adjacent lines of the less than five lines.

According to a further aspect of this embodiment, the method is used to identify a center for the data scan based on the survey scan. The center at least substantially corresponds to the feature midpoint where the feature midpoint generally corresponds to the deepest portion of the at least one feature. In this method, the data scan is performed based on the survey scan, and the moving step provides relative movement between the probe and the sample that is a distance that is a fraction of the first pitch.

In another aspect of this preferred embodiment, the method further comprises oscillating the probe in a flexural mode. Preferably, the flexural mode is a deep trench mode (DT mode).

In yet another aspect, a scanning probe microscope (SPM) comprises a probe having a tip that interacts with a sample including a field of features, and a scanner that provides relative motion between the tip and the sample. The SPM actuates the scanner perform a survey scan to identify the field, and then performs a data scan based on the survey scan. Preferably, the survey scan traverses no more than 5 lines of the field and the survey and data scans together take less than 1 minute.

According to a still further aspect of this embodiment, the SPM includes a computer that analyzes data acquired during the survey and data scans. The data scan data is indicative of a characteristic dimension of at least one of the features. In this embodiment, the measurement of the characteristic dimension has a three sigma dynamic repeatability of less than the greater of about 2.0% of the characteristic dimension and 2.0 nm.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

The preferred embodiments are directed to performing sample measurements with a SPM, particularly measurements of fields of features/devices of semiconductor samples using the pitch of the field. By doing so, the preferred embodiments are able to conduct a preliminary survey scan of the field with only two scan lines or profiles, the scan profiles having a user-selected length to image as many features as desired, overall improving sample throughput and tip life, as well as repeatability. A scan profile generally consists of an array of measurements of one or more properties of a surface in a localized area. Usually a scan profile consists of a series of measurements performed along a single scan line, that is, linearly aligned across a portion of a sample. A scan profile can, however, have an arbitrary shape. Such scan profiles can be arranged, for example, to intersect a larger number of sample features that are not necessarily on the same line. Notably, though not limited thereto, the present techniques provide these benefits when measuring semiconductor samples having feature dimensions that are in line with the International Technology Roadmap for Semiconductors (ITRS).

Figure 2:
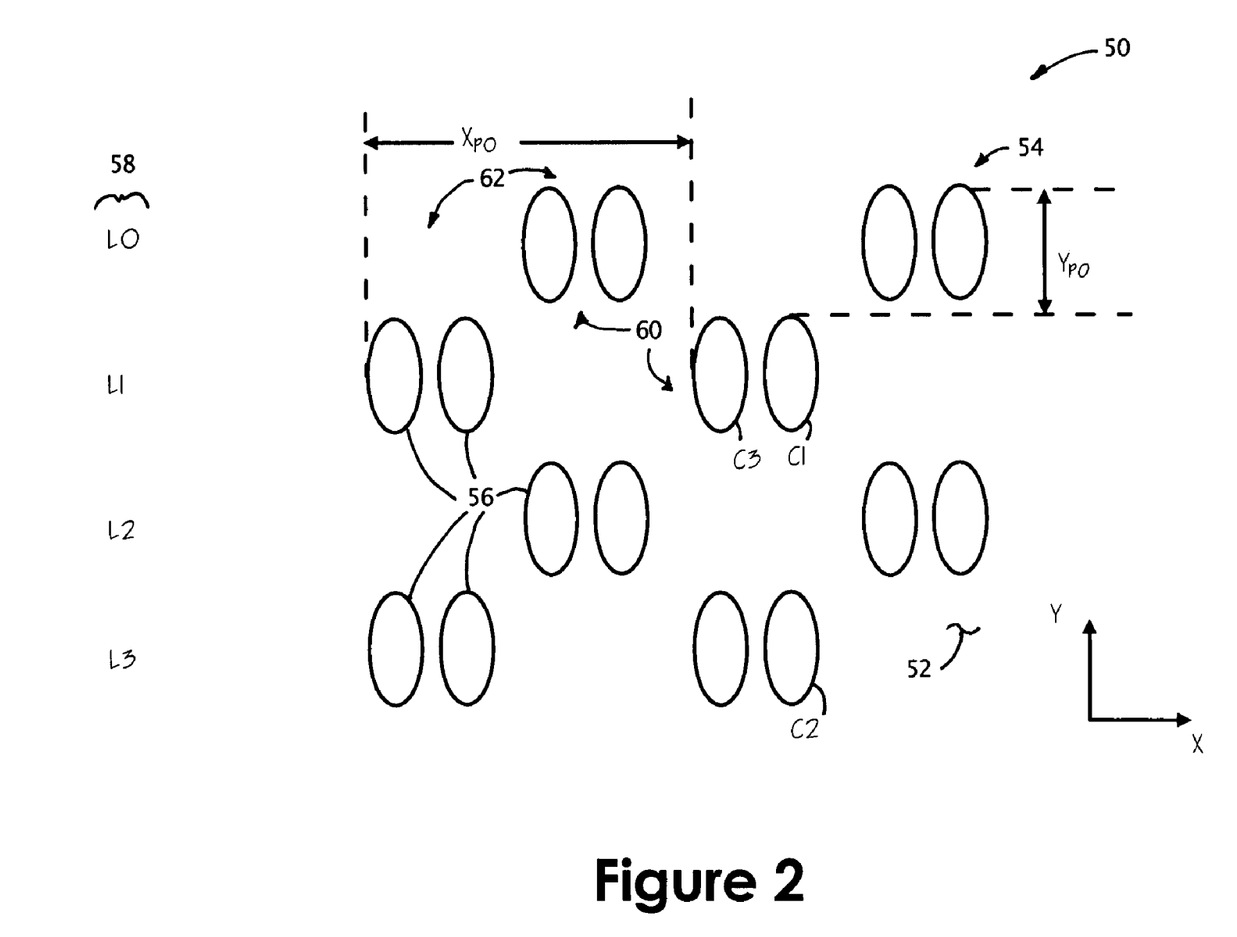
FIG. 2 is a schematic top plan view of a field of semiconductor features, for example, DRAM trench capacitors, oriented in pairs along staggered lines of the wafer.

Turning initially to FIG. 2, a sample 50 including a substrate 52 (e.g., a semiconductor wafer) having formed thereon a feature field 54 of semiconductor features or devices 56, such as DRAM trench capacitors, is shown. When fabricating a semiconductor chip such as that shown in FIG. 2, a series of rows of the devices are disposed in a two-dimensional periodic array to efficiently utilize the real estate of the semiconductor substrate 52. Typically, each row 58 (L0-L3) includes repeating pairs 60 of capacitors 56, the pairs 60 of adjacent rows being offset so that the device pairs 60 of every other row define columns 62 of features 56. In this case, four rows 58 of devices 56 are shown with every other row having pairs of capacitors that are offset from adjacent rows. Notably, the region of the semiconductor chip 50 shown in FIG. 2 includes features having a pitch in the "X" direction, identified as $X_{PO}$, which is the distance in the "X" direction in which the pattern of the features repeats itself. Similarly, the field defines a pitch in the "Y" direction, $Y_{PO}$, being the distance in the Y direction between successive rows of features 56 of the array that are aligned in common columns 62. The X and Y pitch values, $X_{po}$ and $Y_{PO}$, are typically known, either from the design of the wafer itself or, for example, by conducting a preliminary high resolution AFM scan of the sample under test, or another sample that is known to have the same field configuration as the sample.

Figure 3:
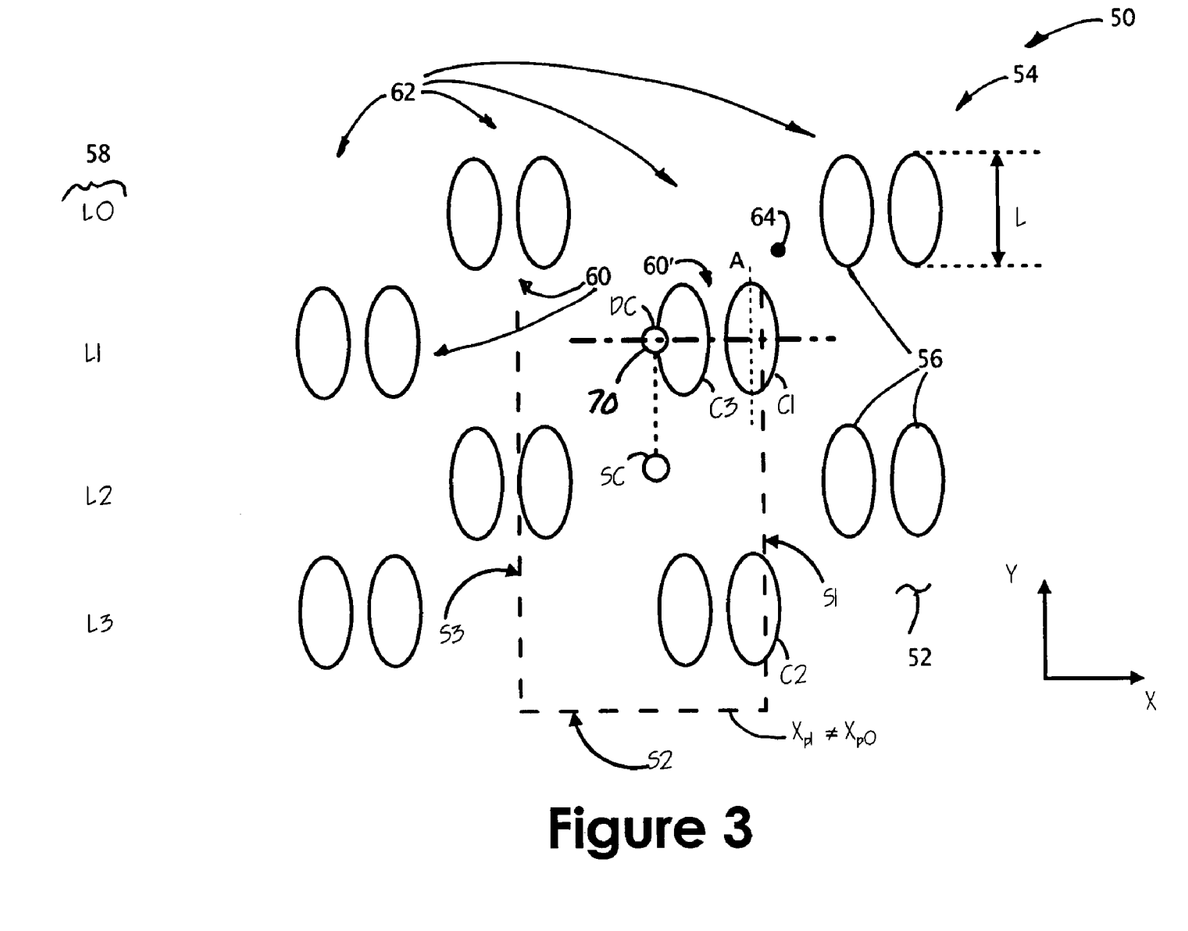
FIG. 3 is a schematic top plan view similar to FIG. 2, illustrating a survey scan according to a preferred embodiment.

To determine a characteristic of the field 54 of trench capacitors 56 (e.g., depth of the trench capacitors 56), a survey scan of the field is initially conducted, as shown in FIG. 3. Using the coordinate system of FIG. 2, illustrating horizontal scan lines L0-L3, it should be first highlighted that the survey scan is preferably performed using a ninety-degree scan, i.e., a scan conducted at ninety-degrees to the direction of the desired data scan of the wafer. In this regard, the scanner can be rotated ninety-degrees; alternatively, the sample can be rotated ninety-degrees such that, in either case, the survey scan is conducted in a direction that is at least substantially parallel to the major axis of the elliptically shaped trench capacitors 56.

In this regard, the AFM must first be operated to engage the AFM tip 19 (FIG. 1) and sample 50. When this is performed, the point 64 at which the tip 19 of the probe 14 of the AFM contacts the sample relative to field 54 is typically unknown such that the field 54 of the capacitors 56 needs to be located, as noted previously. Importantly, the field 54 must be located with generally absolute certainty to insure that the semiconductor feature of interest is being measured at a consistent position throughout the measurement. From the location 64 of tip-sample engage, the algorithm provides relative motion between the AFM probe tip 19 and sample 50 so that the surface can be imaged in a selected mode of operation along, in this case, three separate segments of the survey scan, S1, S2 and S3. Notably, the preferred mode of operation is the oscillating probe deep trench (DT) mode. When imaging the sample during the survey scan, survey data is acquired during substantially parallel segments S1 and S3, while no survey data is taken during the step portion of the scan orthogonal to segments S1 and S3, segment S2.

To ensure that one of the two lines of survey data (S1 and S3) is able to identify the field 54 of trench capacitors 56, the distance of segment S2 of the survey scan is selected to insure that the tip interacts with at least one of the devices 56 being measured in one of the survey scan lines. This is accomplished by setting the length of segment S2 of the survey scan to a value $X_{P1}$ to be unequal to the device pitch, $X_{PO}$, in the X or data scan direction (FIG. 2). By making sure that the orthogonal distance of segment S2 is not equal to the pitch in the X direction of the field, the algorithm insures that the probe will interact with at least one of the features in the field 54, the number of features depending upon the length of the segments S1 and S3. In this regard, the survey scan must traverse a minimum distance during segments S1 and S3, for example, a distance corresponding to at least two lengths "L" of the trench capacitors, or two times the pitch distance, $Y_{PO}$. At least two lengths "L" are required in this case due to the offset of the pairs 60 of trench capacitors 56 among rows 58, as shown in the figures. More preferably, however, S1 and S3 are sufficiently long (for example, four lengths "L") to traverse at least two of the trenches 56 to provide a larger survey population for subsequent data analysis. Again, this can be accomplished without compromising throughput given that the survey scan is only two lines, S1 and S3. Notably, although this discussion only refers to two (2) survey scan lines, more survey scan lines may be used should the user prefer.

Figure 4:
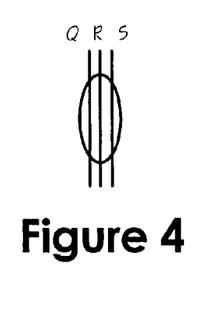
FIG. 4 is a top plan view of one of the trench capacitors of FIGS. 2 and 3.
Figure 5:
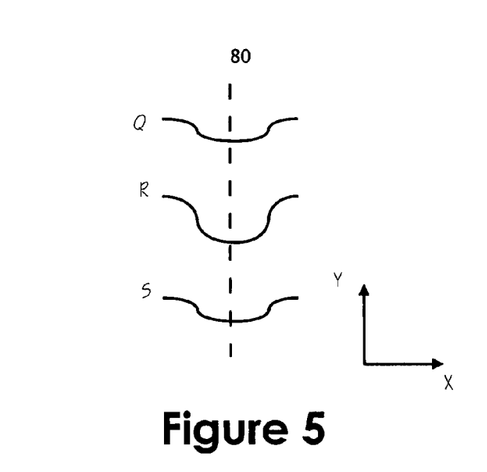
FIG. 5 provides schematic illustrations of the profiles along the lines Q-S of FIG. 4.

As shown in FIG. 3, segment S1 passes through trenches C1 and C2 a distance to the right of the major axis "A" of the elliptically shaped trenches 56. In this regard, the "slice" at which the scan traverses the trenches 56 is substantially immaterial to the goal of identifying a center of the trenches. More particularly, as shown in FIG. 4, the survey scan slice of a trench 56 may be at any one of the locations Q, R or S and, given the general symmetry of the features 56, each slice has the same center point. As a result, each profile will provide the same indication of the location of the deepest portion of the trench. This is illustrated in FIG. 5 showing that, even though the profiles are different, their centers define a common position in the scan or "X" direction.

Figure 6:
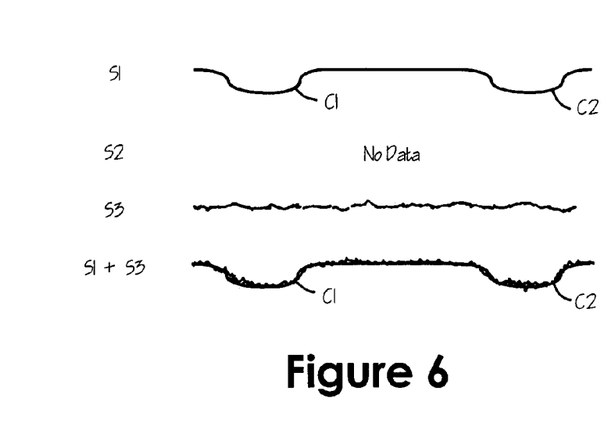
FIG. 6 provides schematic illustrations of the profiles of the trench capacitors resulting from the survey scan shown in FIG. 3, namely along survey scan lines S1 and S3, and illustrating the addition of the profiles associated with scan lines S1 and S3.

Continuing, imaging in DT mode yields profiles of each of the segments S1 and S3, illustrated in FIG. 6. At this point, the survey scan is complete and the algorithm has the necessary data to determine a data scan center. In particular, the profiles associated with the two scan lines S1 and S3 are initially summed to provide profile S1+S3 shown in FIG. 6. In the preferred algorithm of the present invention, a pattern recognition tool, known as the caliper vision tool offered by Cognex Corporation of Natick, Mass., is then employed. As understood in the art, pattern recognition could be replaced by an operation on the scan data directly, instead of converting the scan data to vision models. For example, an operation may be employed to identify edges on scan data directly without pattern recognition software attempting to match model. The Caliper tool, in this case, processes the data of FIG. 6, namely the summation of the profiles of segments S1 and S3, to recognize patterns in that data and assign a score to the summed profiles, features P1 and P2. The Caliper function compares the scores generated for each profile F1, F2 and selects the highest score. For instance, the profile P1 associated with trench capacitor C1 may yield a score that is larger than a score corresponding to profile P2 associated with feature C2. As a result, in the case in which the Caliper function identifies profile P1 (associated with C1), the Caliper tool returns an indication of a center position 70 corresponding to device C1 in data scan line L1.

The next step in determining a center position for the data scan is determining a survey scan center, shown as "SC" in FIG. 3. Survey scan center SC is simply a geometric center of the survey scan, i.e., the intersection of a line through the midpoint of scan lines S1 and S3 and a line orthogonal thereto through the midpoint of S2. With the survey scan center, SC, known, the data scan center can be determined by translating the survey scan center, SC, to a point on capacitor C3 of pair 60' through which a horizontal line (data scan or "X" direction) passing through center position 70 extends. The resultant data scan center, DC, is shown in FIG. 3. More particularly, the "Y" position corresponding to the coordinates associated with the output of the XCALIPER® function provides the data scan center, DC. In this case, DC is positioned in scan line L1 illustrated in FIGS. 2 and 3.

Figure 7:
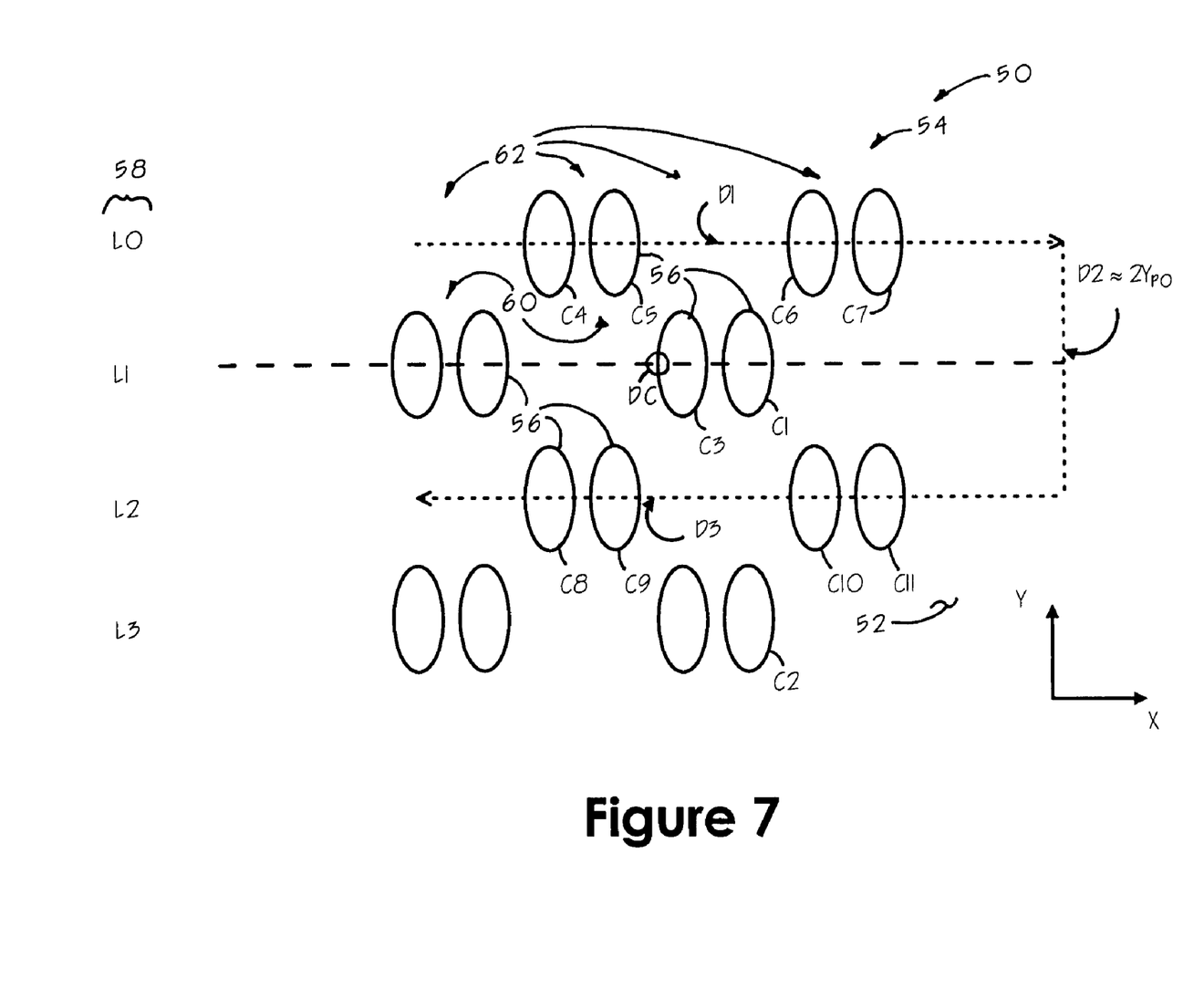
FIG. 7 is a schematic top plan view of the field of trench capacitors of FIG. 2, illustrating a data scan conducted according to a preferred embodiment.

Having determined the data scan center, DC, a data scan can be performed. Turning to FIG. 7, the data scan center DC is along line L1 and provides a center for the data scan that, in this case, traverses lines L0 and L2 of the field 54 of trench capacitors 56. Similar to the survey scan, the data scan traverses three segments or data acquisition lines shown in FIG. 7, D1, D2 and D3. Also similar to the survey scan, preferably no data is acquired during the step segment, segment D2. By conducting the survey scan and subsequent pattern recognition functions as described above, scan segments D1 and D3, which are generally parallel, pass substantially through the centers of the trenches contained on lines L0 and L2 (i.e., feature midpoint), as desired, thus providing an indication of maximum trench depth, as discussed earlier.

Figure 8:
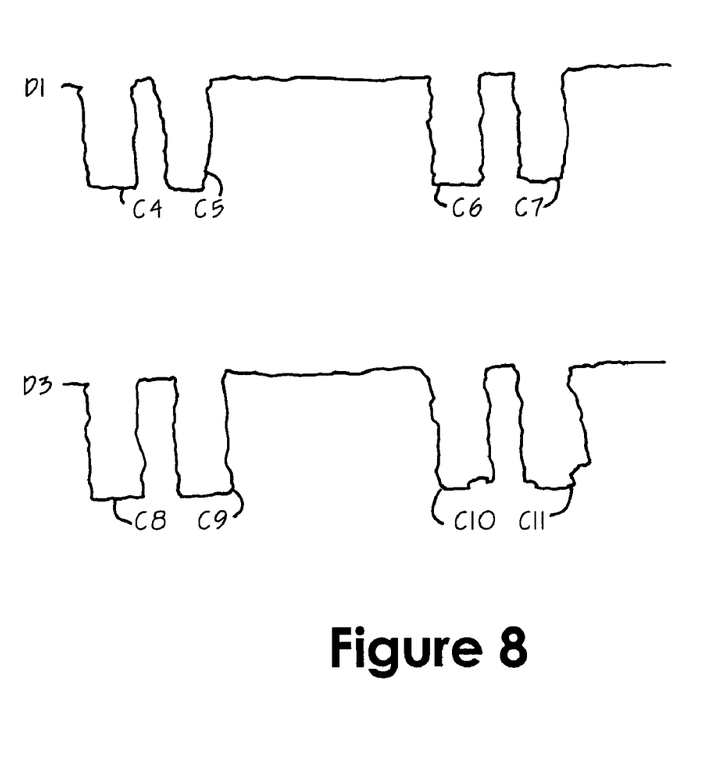
FIG. 8 provides schematic illustrations of the profiles of the trench capacitors resulting from the data scan of FIG. 7.

Segment D2 is preferably set at least substantially equal to two times the Y pitch, $Y_{PO}$, shown in FIG. 2. By setting D2 to this distance, corresponding aligned rows 58 (as opposed to the rows offset therefrom) of trench capacitors 56, namely L0 and L2, are traversed and imaged by the AFM. Based on the acquired data concerning the features, the trench profiles shown in FIG. 8 can be plotted and a characteristic feature can be measured. In this case, because the survey scan provides an indication of the center of the devices 56, which substantially corresponds to the location of maximum device depth, an indication of maximum trench depth is readily identified.

Notably, while the survey scan is a ninety degree scan, the data scan may be conducted according to a conventional two-dimensional AFM raster scan, as shown in FIGS. 2, 3 and 7. Similar to the survey scan, however, each feature 56 need only be traversed with one scan line to provide an indication of maximum depth of that feature given that the data center, DC, computed using the two-line survey scan elegantly causes the data scan to traverse the centers of the features within acceptable tolerances. Notably, tolerances are feature dependent, with the pattern recognition software having sub-pixel precision/repeatability. Moreover, although the above steps have been described as happening in succession, they need not necessarily be performed in the stated order. For instance, the survey scan center, SC, may be determined when the user selects the parameters of the survey scan, including scan size.

Figure 9:
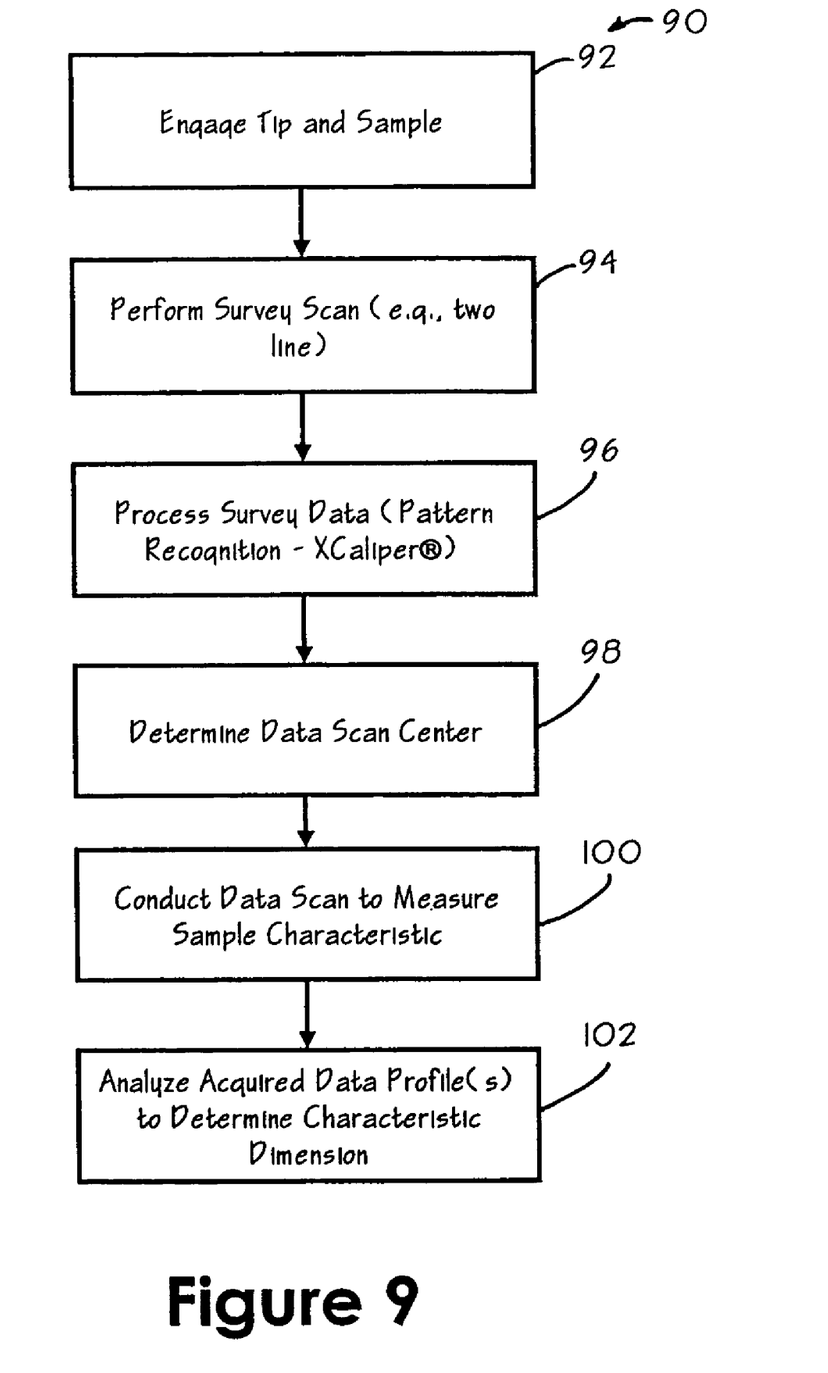
FIG. 9 is a flow diagram illustrating the method steps of a preferred embodiment.

FIG. 9 sets forth a flow diagram illustrating the preferred algorithm 90 described in detail above. After the tip and sample are engaged with one another in the probe engagement Block 92 (probe engagement being the process of relatively positioning the probe and sample to perform a subsequent AFM measurement without damaging either the probe or sample), algorithm 90 performs a survey scan in Block 94. Preferably, the survey scan, as noted previously, is a two-line survey scan that efficiently locates the field of features on the sample of interest by making sure the "step" segment (S2 in FIG. 3) is a fraction/multiple of the pitch, $X_{PO}$. Next, in Block 96, the survey scan data is processed. Preferably, a pattern recognition function, such as the XCALIPER® routine noted previously, is used to identify features of the sample and assign an appropriate score to each. Based on the scores associated with the different features, a particular feature, typically the one having the highest score is identified to locate the field, and the center coordinates of the feature are preferably stored. This step facilitates locating a center point for the subsequent data scan.

Using the identified feature and its corresponding center coordinates, as well as the survey scan center, SC, a data scan center, DC, is determined in Block 98. Thereafter, a data scan is performed in Block 100. The profile data generated as a result of Block 100 is then used to determine a characteristic of the sample (e.g., a characteristic dimension) in Block 102. Notably, after tip-sample engage in Block 92, the remaining steps of algorithm 90 may be performed in less than one (1) minute providing a significant throughput improvement over the prior art, as discussed previously. Once the algorithm 90 is complete, another sample may be processed as described above.

With the above-described AFM and method, the preferred embodiments allow the user to employ a two-line survey scan to determine an alignment in "X" (i.e., alignment for a data scan in the "X" direction) corresponding to a field 54 of trench capacitors 56 so that the data scan lines D1 and D3 (again, no data is taken during the step segment D2) traverse the centerline of the devices of the corresponding portion of the field 54. Again, by passing through the centers of the devices 56, the point of greatest trench depth can be estimated even though the features may have variations in depth given that the measurement provided by the preferred embodiments does not breach acceptable tolerances.

Overall, the preferred embodiments have particular utility in the semiconductor industry providing measurements of features/devices having dimensions (trench depth, etc.) consistent with the current International Technology Roadmap for Semiconductors (ITRS), such as sub-110 nm ITRS technology node trench capacitors. With the current technique, the characteristic dimension (e.g., trench depth) has a 3-σ dynamic repeatability of less than about the greater of 2.0% of the characteristic dimension and 2.0 nm, facilitated by the minimum number of required survey/data scan lines which helps make the system robust even under varied environmental conditions (e.g., which may cause thermal drift, etc.). More preferably, the dynamic repeatability has been shown to be less than the greater of 1.0% of the characteristic dimension or 1.5 nm. Moreover, in the particular application concerning sub-110 nm ITRS trench capacitors, sample throughput is greatly improved over prior methods. For instance, while prior methods take well over at least one minute from probe-engage to data acquisition concerning three (3) trench capacitors, the preferred embodiments take less than one (1) minute from probe-sample engage, and typically less than five (5) seconds. Of course, though useful in semi-applications, the present algorithm provides these benefits in terms of throughput and repeatability in a wide variety of AFM applications.

Figure 10:
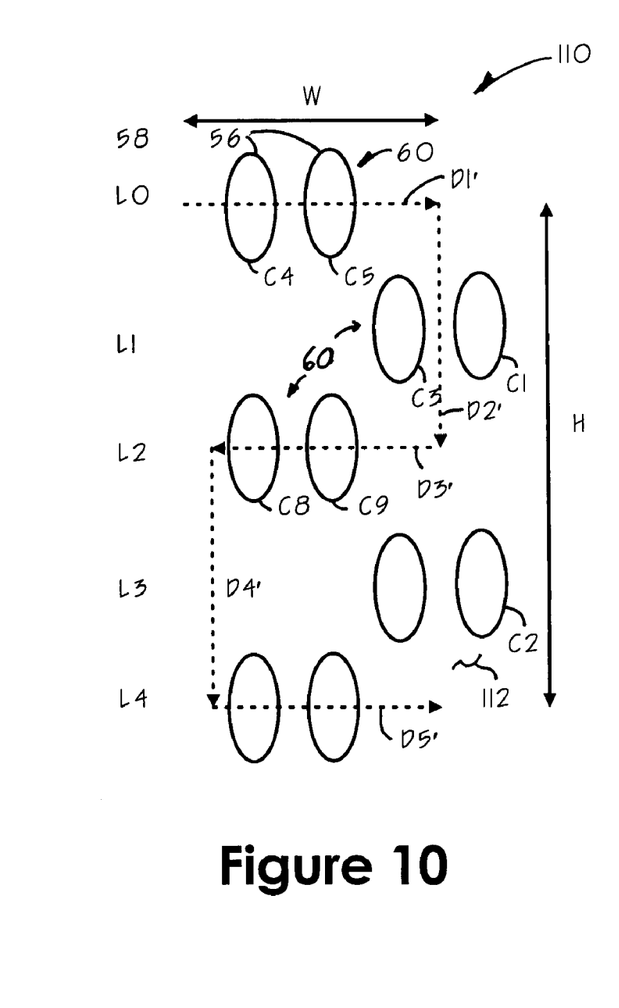
FIG. 10 is a schematic top plan view of a data scan according to a preferred embodiment, using a low aspect ratio data scan.

Turning to FIG. 10, a low aspect ratio data scan may be conducted to determine a data scan center that yields a data scan having a lower aspect ratio than the aspect ratio of the data scan shown previously (FIG. 7). Such a data scan can be employed to more efficiently (for instance, with greater throughput and less tip wear) scan a sample 110 having a surface 112. The data scan in this case is a low aspect ratio scan because the ratio of the width "W" to the height "H" of the scan (i.e., aspect ratio) is much less than the that of the scan illustrated in FIG. 7. In particular, width W is substantially less than the height H in this case (generally opposite to that of the scan in FIG. 7).

In particular, rather than the "dead time" between features C5 and C6 shown in FIG. 7 on segment D1 of the data scan ("dead time" referring to a portion of the AFM data scan during which no feature is being imaged, which typically occurs due to the offset nature of the rows 58 of features 56), this dead time can be reduced significantly, as shown in FIG. 10. After initially scanning line D1́ (passing through centers of features C4, C5), a step D2́ is performed. The step D2́ remains two times the Y pitch, $Y_{po}$, as before (FIG. 7), but as soon as the D2́ segment of the data scan is traversed, trench capacitors C8, C9 are imaged with little dead time scanning of surface 112, i.e., without imaging space between pairs 60 of the trench capacitors 56 on the data scan lines L0, L2 and L4 in FIG. 10. In general, the efficiency is realized by understanding that the time in which it takes to traverse a step segment the data scan (D2 in FIG. 10, in which feedback may be turned off, for instance), is generally substantially less than the time it takes to traverse from C5 to C6 along, for instance, scan line D1 in FIG. 7.

Although the best mode contemplated by the inventors of carrying out the present invention is disclosed above, practice of the present invention is not limited thereto. For example, the sample may be subjected to alternate environments (e.g., varied media, atmospheric conditions, etc.), and can be used to provide measurements over a wide variety of samples. It will be manifest that various additions, modifications and rearrangements of the features of the present invention may be made without deviating from the spirit and scope of the underlying inventive concept.

What is claimed is:

1. A method of acquiring data from a field of features of a sample, the method comprising:
   performing a survey scan to locate the field, wherein the survey scan locates the field using no more than five survey scan lines; and
   performing a data scan to acquire data indicative of the features.

2. The method of claim 1, wherein the survey scan locates the field of features using no more than two survey scan lines.

3. The method of claim 2, wherein a distance between adjacent survey scan lines is substantially not equal to the pitch of the feature field in a direction orthogonal to the survey scan lines.

4. The method of claim 1, wherein the data scan is performed only along at least substantially parallel data acquisition lines.

5. The method of claim 4, wherein an aspect ratio of an image from the data scan is such that the dimension of the ratio in a direction of the scan lines is larger than the dimension of the ratio in a direction orthogonal to the scan lines.

6. The method of claim 1, wherein the survey scan is performed along a first axis, and wherein the data scan is performed along a second axis that is at least substantially orthogonal to the first axis.

7. The method of claim 6, wherein the distance between the data acquisition lines is at least approximately equal to twice the pitch of the feature field along the first axis.

8. The method of claim 7, further comprising determining a center of a scan area of the data scan from the survey scan.

9. The method of claim 8, wherein the determining step uses pattern recognition on the data acquired from the survey scan.

10. The method of claim 1, wherein only a single survey scan is performed prior to the data scan.

11. A method comprising:
    acquiring data from each of at least three trench capacitors of a trench capacitor field using a scanning probe microscope, the acquiring step taking less than one (1) minute from probe engagement; and
    analyzing the acquired data to determine a characteristic dimension of the trench capacitors, wherein the characteristic dimension has a three sigma dynamic repeatability of less than the greater of about 2.0% of the characteristic dimension and 2.0 nm.

12. The method of claim 11, wherein data is acquired in less than 30 seconds.

13. The method of claim 12, wherein data is acquired in less than 5 seconds.

14. The method of claim 11, wherein the characteristic dimension has a three sigma dynamic repeatability of less than the greater of 1.0% of the characteristic dimension and 1.5 nm.

15. The method of claim 11, wherein the trench capacitors are sub-110 nm node trench capacitors.

16. The method of claim 11, wherein the acquiring step includes,
    performing a survey scan along a first axis to locate the field on the sample surface; and
    performing a data scan along a second axis to measure the dimension, the second axis being at least substantially orthogonal to the first axis.

17. The method of claim 16, wherein a single survey scan is performed prior to the data scan.

18. The method of claim 17, further comprising determining a center of a scan area of the data scan from the survey scan.

19. The method of claim 16, wherein the survey scan locates the field of trench capacitors using no more than five scan lines.

20. The method of claim 19, wherein the survey scan locates the field of trench capacitors using no more than two scan lines.

21. A method of operating a scanning probe microscope (SPM) including a probe having a cantilever, the method comprising the steps of:
    engaging the probe and a sample, the sample including a field of features having a first pitch in a direction of scanning and a second pitch in a direction ninety degrees to the scanning direction;
    performing a survey scan of the sample along less than five lines of the sample, said performing step including providing relative motion between the probe and the sample substantially orthogonally to the scanning direction between adjacent lines of the less than five lines.

22. The method of claim 21, further comprising:
    identifying a center for a data scan based on the survey scan, the center corresponding to a midpoint of at least one of the features in a line, the feature midpoint center generally corresponding to the deepest portion of the at least one feature;
    performing the data scan based on the survey scan;
    wherein said moving step provides relative movement between the probe and the sample that is a fraction of the first pitch is substantially not equal to the first pitch; and
    wherein said identifying step includes using pattern recognition.

23. The method of claim 21, wherein the survey scan is performed at 90 degrees to the data scan.

24. The method of claim 21, further comprising oscillating the probe in a flexural mode.

25. The method of claim 24, further comprising oscillating the probe in a deep trench mode.

26. The method of claim 21, wherein said performing steps are completed in less than 1 minute.

27. The method of claim 26, wherein said performing steps are completed in less than 5 seconds.

28. The method of claim 26, further comprising determining a characteristic dimension of at least one of the features, wherein the characteristic dimension has a three sigma dynamic repeatability of less than the greater of about 2.0% of the characteristic dimension and 2.0 nm.

29. The method of claim 28, wherein the features are trench capacitors.

30. A scanning probe microscope (SPM) comprising:
- a probe having a tip that interacts with a sample including a field of features;
- a scanner that provides relative motion between the tip and the sample to (a) perform a survey scan to locate the field and then (b) perform a data scan based on the survey scan; and
- wherein the survey scan includes no more than 5 scan lines, and the survey and data scans together take less than 1 minute.

31. The SPM of claim 30, wherein the survey scan traverses two scan lines.

32. The SPM of claim 30, further comprising a computer that analyzes data acquired during the survey and data scans, the data scan data being indicative of a characteristic dimension of at least one of the features, and wherein the characteristic dimension has a three sigma dynamic repeatability of less than the greater of about 2.0% of the characteristic dimension and 2.0 nm.

* * * * *